US012710098B2

(12) United States Patent
He et al.

(10) Patent No.: US 12,710,098 B2
(45) Date of Patent: Aug. 18, 2026

(54) VALVE NEEDLE AND ELECTRONIC EXPANSION VALVE HAVING VALVE NEEDLE

(71) Applicant: ZHEJIANG DUNAN ARTIFICIAL ENVIRONMENT CO., LTD., Shaoxing (CN)

(72) Inventors: Yuchen He, Shaoxing (CN); Yonghao Chen, Shaoxing (CN); Guanjun Xu, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 49 days.

(21) Appl. No.: 18/688,793

(22) PCT Filed: Aug. 31, 2022

(86) PCT No.: PCT/CN2022/116321
§ 371 (c)(1),
(2) Date: Mar. 4, 2024

(87) PCT Pub. No.: WO2023/030409
PCT Pub. Date: Mar. 9, 2023

(65) Prior Publication Data

US 2024/0369140 A1 Nov. 7, 2024

(30) Foreign Application Priority Data

Sep. 2, 2021 (CN) ......................... 202122114250.6

(51) Int. Cl.
*F16K 1/12* (2006.01)
*F25B 41/34* (2021.01)

(52) U.S. Cl.
CPC ................ *F16K 1/12* (2013.01); *F25B 41/34* (2021.01)

(58) Field of Classification Search
CPC ... F16K 1/42; F16K 27/02; F16K 1/38; F16K 1/54; F16K 1/32; F16K 31/02; F16K 1/385; F25B 41/31; F25B 41/34
See application file for complete search history.

(56) References Cited

U.S. PATENT DOCUMENTS

2014/0283546 A1 9/2014 Wakisaka
2017/0002931 A1 1/2017 Shu et al.
2019/0368618 A1* 12/2019 Wei ........................... F16K 1/52

FOREIGN PATENT DOCUMENTS

CN 103574062 A * 2/2014 .............. F25B 41/31
CN 103968620 A 8/2014
(Continued)

OTHER PUBLICATIONS

Office action of counterpart JP application No. 2024-506461 issued on Jul. 1, 2025.

(Continued)

*Primary Examiner* — Frantz F Jules
*Assistant Examiner* — Martha Tadesse
(74) *Attorney, Agent, or Firm* — The Sun IP Law

(57) ABSTRACT

Disclosed are a valve needle and an electronic expansion valve having the valve needle. The valve needle is provided with a connecting end and a blocking end that are arranged opposite to each other; the blocking end includes a blocking segment, a first opening segment, and a second opening segment that are sequentially connected in an axial direction; the blocking segment cooperates with a valve port to block the valve port; a cross sectional area of the blocking segment close to the connecting end is greater than a cross sectional area of the blocking segment distant from the connecting end; a cross sectional area of the second opening segment close to the connecting end is greater than a cross sectional area of the second opening segment distant from
(Continued)

the connecting end; and a cross sectional area of the first opening segment remains unchanged.

17 Claims, 3 Drawing Sheets

(56) References Cited

FOREIGN PATENT DOCUMENTS

| | | | | |
|---|---|---|---|---|
| CN | 108361393 A | | 8/2018 | |
| CN | 109990103 A | | 7/2019 | |
| CN | 112503189 A | | 3/2021 | |
| CN | 216158328 U | | 4/2022 | |
| EP | 1410847 A2 | * | 4/2004 | ........... B05C 5/0225 |
| JP | 2013108647 A | | 6/2013 | |
| JP | 2014185734 A | * | 10/2014 | .............. B60T 8/363 |
| JP | 2018035840 A | | 3/2018 | |
| JP | 2019132347 A | * | 8/2019 | .............. F25B 41/34 |
| JP | 2019190514 A | | 10/2019 | |
| JP | 2020109323 A | | 7/2020 | |
| WO | 2021057299 A1 | | 4/2021 | |

OTHER PUBLICATIONS

Extended search report of counterpart EP application No. 22863544.7 issued on Jun. 30, 2025.
The first Office Action of counterpart Korean application No. 10-2024-7010959 issued on Aug. 14, 2025.
Second Office Action of counterpart JP application No. 2024-506461 issued on Jan. 20, 2026.

* cited by examiner

VALVE NEEDLE AND ELECTRONIC EXPANSION VALVE HAVING VALVE NEEDLE

CROSS-REFERENCE TO RELATED APPLICATION

The present disclosure is a national stage application of International Patent Application No. PCT/CN2022/116321, which is filed on Aug. 31, 2022 and claims priority to Chinese Patent Application No. 202122114250.6, filed to the China National Intellectual Property Administration on Sep. 2, 2021 and entitled "Valve Needle and Electronic Expansion Valve Having Valve Needle".

TECHNICAL FIELD

The present disclosure relates to a technical field of control valves, and in particular to a valve needle and an electronic expansion valve having the valve needle.

BACKGROUND

An electronic expansion valve, as an electronic control component, is widely used in a refrigeration system due to its high precision and capability of achieving optimized control of the system. The electronic expansion valve is used to control a flow rate of a refrigerant in an air conditioning system. When a plurality of indoor units of a central air conditioner do not work at the same time, the electronic expansion valve of the indoor unit that does not work needs to remain a small opening to keep the refrigerant in a circulation state, thereby preventing the accumulation of the refrigerant near a valve port and blocking the valve port. In a related art, a diameter of an opening segment of a valve needle gradually decreases in a direction towards a head of the valve needle. However, an assembly error generally exists when the electronic expansion valve is assembled. Therefore, the flow rate of the refrigerant cannot be accurately controlled when the electronic expansion valve remains the small opening, resulting in the flow rate of the refrigerant being too fast or too slow, which affects the use of the air conditioner.

SUMMARY

The present disclosure provides a valve needle and an electronic expansion valve having the valve needle, so as to solve the problem in the related art that the flow rate of a refrigerant cannot be accurately controlled when the electronic expansion valve remains a small opening.

According to one aspect of some embodiments of the present disclosure, a valve needle is provided. The valve needle is provided with a connecting end and a blocking end that are arranged opposite to each other. The blocking end includes a blocking segment, a first opening segment, and a second opening segment that are sequentially connected in an axial direction. The blocking segment is configured to cooperate with a valve port to block the valve port. A cross sectional area of the blocking segment close to the connecting end is greater than a cross sectional area of the blocking segment distant from the connecting end. A cross sectional area of the second opening segment close to the connecting end is greater than a cross sectional area of the second opening segment distant from the connecting end. The cross sectional area of the blocking segment distant from the connecting end is equal to the cross sectional area of the second opening segment close to the connecting end. A cross sectional area of the first opening segment remains unchanged. The cross sectional area of the first opening segment remains unchanged, that is, a gap between the first opening segment and the valve port remains unchanged, so that when the first opening segment is located at the valve port, even with a certain assembly error, the valve opening can remain stable, that is, the flow rate remains stable.

By applying the technical solution of the present disclosure, the blocking end includes the blocking segment, the first opening segment, and the second opening segment that are sequentially connected in the axial direction, the blocking segment is configured to block the valve port, the second opening segment is configured to adjust the valve opening to adjust the flow rate, the cross sectional area of the first opening segment remains unchanged, and even if the assembly error exists when the electronic expansion valve is assembled, it is also ensured that the gap between the first opening segment and the valve port remains unchanged, so that the electronic expansion valve remains the small opening stably, and then the flow rate of the refrigerant can be accurately controlled.

Further, the first opening segment is a cylindrical segment, and the blocking segment is a conical segment. The first opening segment is set as the cylindrical segment, the structure is simple and the cross sectional area remains unchanged, so that the flow rate of the valve remains unchanged when the first opening segment is located at the valve port.

Further, a length of the first opening segment is greater than or equal to 0.1 mm and less than or equal to 0.6 mm. In this way, the length of the first opening segment does not affect an overall length of a valve body, and even if an error exists in the positioning of a valve head, it may also be ensured that the first opening segment is located at the valve port.

Further, the second opening segment includes a plurality of circulation segments that are sequentially connected in the axial direction. Cross sectional areas of at least two circulation segments in the plurality of circulation segments are different, and in the at least two circulation segments, a cross sectional area of a circulation segment distant from the connecting end is less than a cross sectional area of a circulation segment close to the connecting end. The cross sectional areas of at least two circulation segments are set to be different, so that the valve openings are different when the different circulation segments are located at the valve port, thereby achieving the effect of adjusting the flow rate.

Further, cross sectional areas of the plurality of circulation segments gradually decrease in a direction distant from the connecting end. The valve openings when the plurality of circulation segments are located at the valve port sequentially increase in the direction distant from the connecting end, thereby adjusting the flow rate.

Further, the circulation segments are conical segments, and cone angles of the circulation segments gradually increase in the direction distant from the connecting end. In this way, the electronic expansion valve has the following flow characteristic curve: when the opening is small, the flow characteristic curve changes gently, so as to meet the requirement of a customer for stable adjustment under a working condition of a small flow rate, and when the opening is large, the flow rate changes greatly, that is, the requirement for quickly increasing the flow rate is met when the opening is large.

Further, a surface roughness of the first opening segment and the second opening segment is less than or equal to 1.6

μm. In this way, it is ensured that a flow adjustment accuracy is relatively high when the first opening segment and the second opening segment are located at the valve port.

Further, a roundness of the first opening segment and the second opening segment is less than or equal to 0.005 mm, so it is ensured that the flow adjustment accuracy is relatively high when the first opening segment and the second opening segment are located at the valve port.

Further, the blocking end further includes a diversion segment. The diversion segment is arranged on a side of the blocking segment close to the connecting end, the blocking segment is connected with the diversion segment, and a cross sectional area of the diversion segment close to the connecting end is greater than a cross sectional area of the diversion segment distant from the connecting end.

According to another aspect of the present disclosure, an electronic expansion valve is provided, including the valve needle described in the above technical solution. The electronic expansion valve is provided with the valve port, the valve needle is movably arranged at the valve port, the electronic expansion valve has a working state and a stopping state, in a case where the electronic expansion valve is in the working state, the second opening segment of the valve needle is located at the valve port, and in a case where the electronic expansion valve is in the stopping state, the blocking segment of the valve needle is located at the valve port.

Further, a gap between the valve port and a first opening segment is greater than or equal to 0.01 mm and less than or equal to 0.06 mm to ensure that the flow rate is relatively small when the first opening segment is located at the valve port.

BRIEF DESCRIPTION OF THE DRAWINGS

The drawings of the specification, which constitute a part of the present disclosure, are intended to provide a further understanding of the present disclosure, and the exemplary embodiments of the present disclosure and the description thereof are intended to explain the present disclosure and do not constitute an undue limitation on the present disclosure. In the drawings.

Herein, the above drawings include the following reference signs.

10. Valve needle; 11. Connecting end; 12. Blocking end; 121. Blocking segment; 122. First opening segment; 123. Second opening segment; 1231. Circulation segment; 124. Diversion segment; 21. Valve port.

DETAILED DESCRIPTION OF THE EMBODIMENTS

The technical solutions in embodiments of the present disclosure will be clearly and completely described below in conjunction with the drawings in the embodiments of the present disclosure. It is apparent that the described embodiments are only part of the embodiments of the present disclosure but not all of the embodiments. The following description of at least one exemplary embodiment is only illustrative actually, and in no way serves as any limitation on the present disclosure or application or use thereof. All other embodiments obtained by those of ordinary skill in the art on the basis of the embodiments of the present disclosure without creative efforts are within the scope of protection of the present disclosure.

Figure 1:
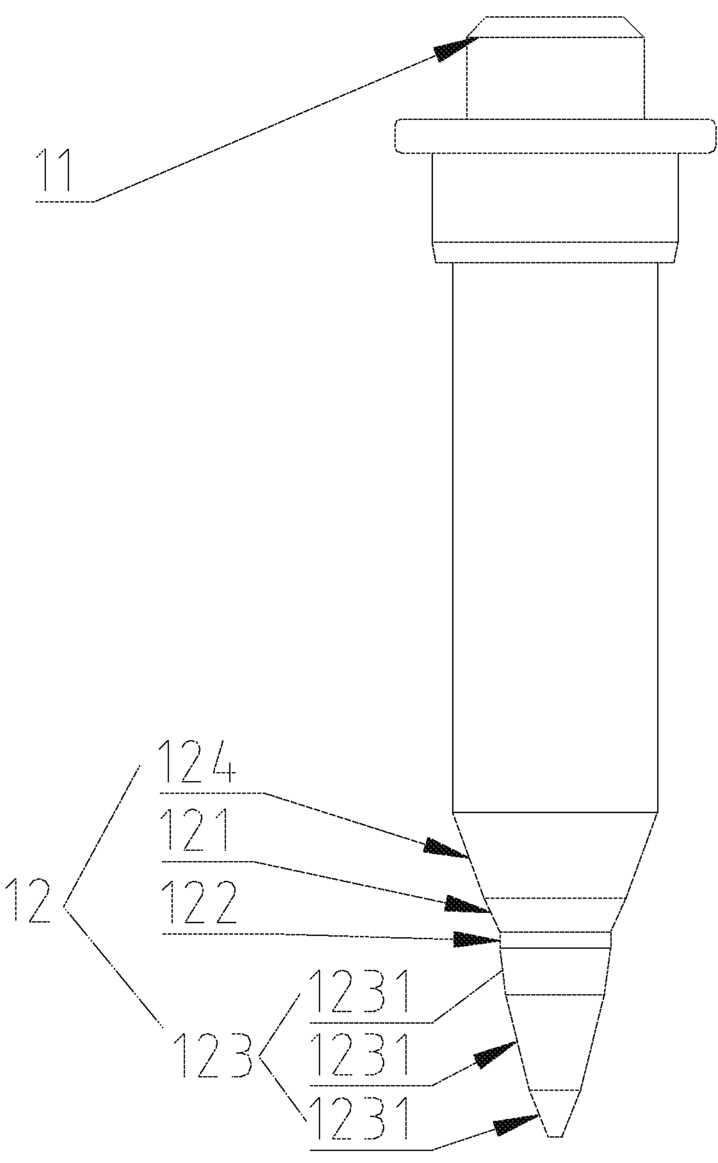
FIG. 1 shows a schematic structural diagram of a valve needle according to an embodiment of the present disclosure.
Figure 4:
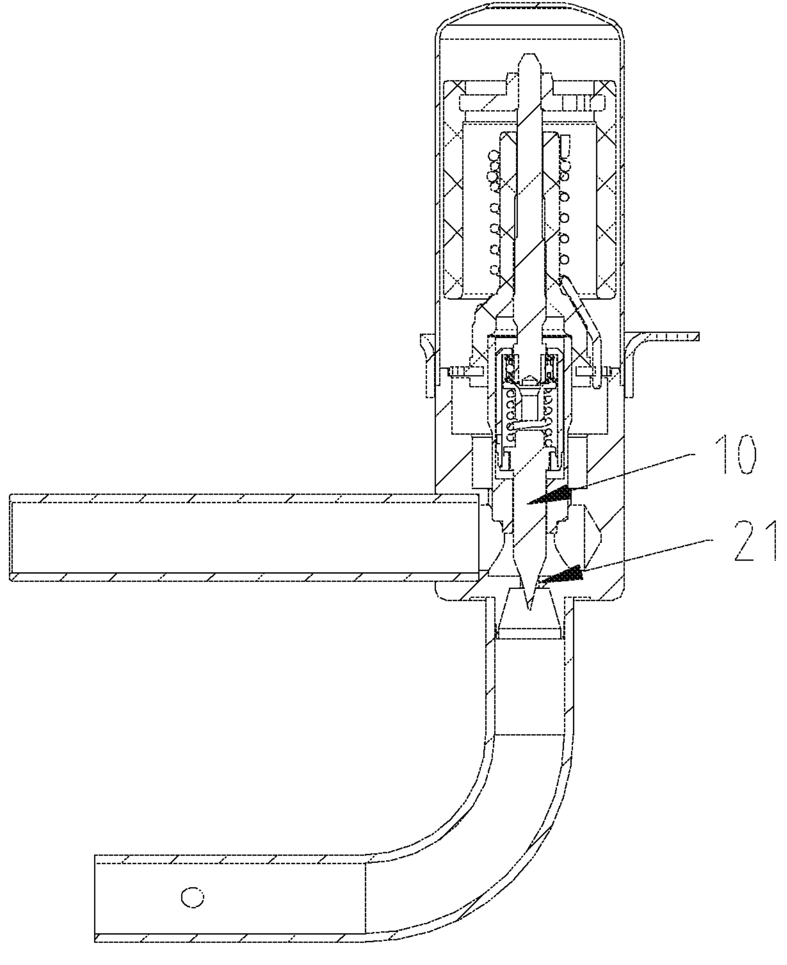
FIG. 4 shows a schematic structural diagram of an electronic expansion valve according to the present disclosure.

As shown in FIG. 1 and FIG. 4, embodiments of the present disclosure provide a valve needle. The valve needle 10 is provided with a connecting end 11 and a blocking end 12 that are arranged opposite to each other. The blocking end 12 includes a blocking segment 121, a first opening segment 122, and a second opening segment 123 that are sequentially connected in an axial direction. The blocking segment 121 is configured to cooperate with a valve port 21 to block the valve port 21. A cross sectional area of the blocking segment 121 close to the connecting end 11 is greater than a cross sectional area of the blocking segment 121 distant from the connecting end 11. A cross sectional area of the second opening segment 123 close to the connecting end 11 is greater than a cross sectional area of the second opening segment 123 distant from the connecting end 11. The cross sectional area of the blocking segment 121 distant from the connecting end 11 is equal to the cross sectional area of the second opening segment 123 close to the connecting end 11. A cross sectional area of the first opening segment 122 remains unchanged. The connecting end 11 is connected with a screw of the electronic expansion valve, and the screw drives the valve needle 10 to block or be distant from the valve port 21 under a drive of a rotor assembly. When the electronic expansion valve is stopped, a refrigerant fluid inside the electronic expansion valve needs to be emptied and the blocking segment 121 blocks the valve port 21.

By applying the technical solution of the present disclosure, the blocking end 12 includes the blocking segment 121, the first opening segment 122, and the second opening segment 123 that are sequentially connected in the axial direction, the blocking segment 121 is configured to block the valve port 21, the second opening segment 123 is configured to adjust a valve opening to adjust a flow rate, and the cross sectional area of the first opening segment 122 remains unchanged, that is, a gap between the first opening segment 122 and the valve port 21 remains unchanged. In this way, even if the assembly error exists when the electronic expansion valve is assembled, it may be also ensured that the gap between the first opening segment 122 and the valve port 21 remains unchanged, so that the electronic expansion valve remains a small opening stably, and then the flow rate of the refrigerant can be accurately controlled.

In some embodiments, the first opening segment 122 is a cylindrical segment, and the blocking segment 121 is a conical segment. The first opening segment 122 is set as the cylindrical segment, the structure is simple and the cross sectional area remains unchanged, so that the valve opening remains unchanged when the first opening segment 122 is located at the valve port 21. The blocking segment 121 is the conical segment, which can close the valve port 21 more tightly.

In some embodiments, a length of the first opening segment 122 is greater than or equal to 0.1 mm and less than or equal to 0.6 mm. In this way, the length of the first opening segment 122 is greater than a positioning error of a valve head, so that even if an error exists in the positioning of the valve head, it is ensured the first opening segment 122 is located at the valve port 21, thereby ensuring the stability of the flow rate. The length of the first opening segment 122 is relatively small, which may not affect an overall length of the valve body. Specifically, the length of the first opening segment 122 may be 0.1 mm, 0.3 mm, 0.45 mm or 0.6 mm.

In the embodiment, the second opening segment 123 includes a plurality of circulation segments 1231 that are sequentially connected in the axial direction. Cross sectional areas of at least two circulation segments 1231 in the plurality of circulation segments 1231 are different, and a cross sectional area of a circulation segment 1231 distant from the connecting end 11 is less than a cross sectional area of a circulation segment 1231 close to the connecting end 11. The cross sectional areas of at least two circulation segments 1231 are set to be different, that is, the gaps between the circulation segments 1231 and the valve port 21 are different, so that the valve openings are different when the different circulation segments 1231 are located at the valve port 21, thereby achieving the effect of adjusting the flow rate.

In some embodiments, cross sectional areas of the plurality of circulation segments 1231 gradually decrease in a direction distant from the connecting end 11. That is, in the direction distant from the connecting end 11, the valve openings 21 when the circulation segments 1231 are located at the valve port 21 sequentially increase, thereby adjusting the flow rate. When the valve needle moves in the direction from the blocking end 12 to the connecting end 11, the flow rate gradually increases.

Figure 2:
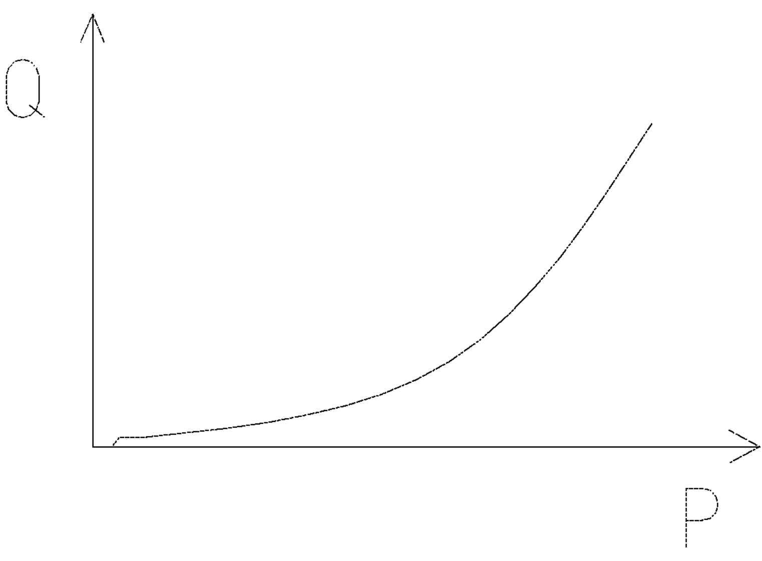
FIG. 2 shows a flow characteristic curve diagram corresponding to a valve needle according to an embodiment of the present disclosure.
Figure 3:
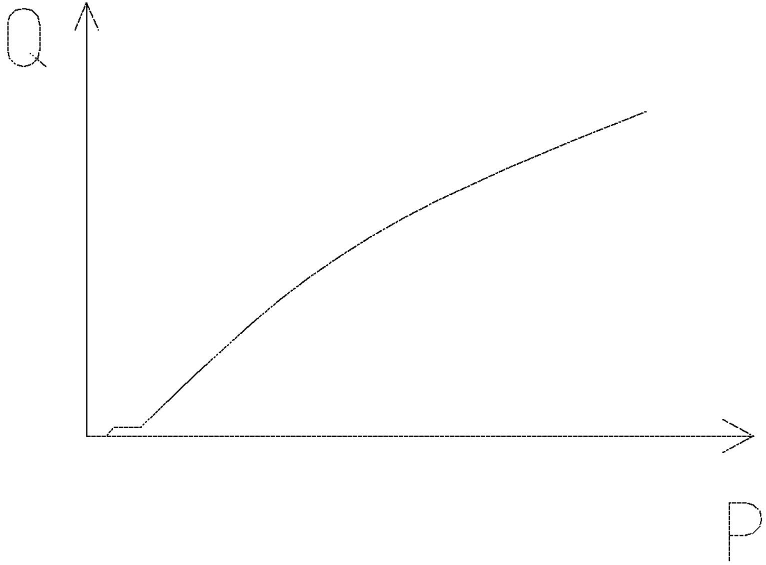
FIG. 3 shows a flow characteristic curve diagram corresponding to a valve needle in the related art.

Specifically, the plurality of circulation segments 1231 are conical segments, and cone angles of the plurality of circulation segments 1231 gradually increase in the direction distant from the connecting end 11. In an art known to inventors, one end blocking the valve port of the valve needle is generally tapered. FIG. 2 shows a flow characteristic curve of a valve needle according to the technical solution, FIG. 3 shows a flow characteristic curve of an existing valve needle, by comparing FIG. 2 and FIG. 3, it may be seen that through the valve needle provided by the technical solution, the electronic expansion valve has a following flow characteristic curve: when the opening is small, the flow characteristic curve changes gently to meet a requirement of a customer for stable adjustment under a working condition of a small flow rate, and when the opening is large, the flow characteristic curve changes greatly, and at the same time, the requirement for quickly increasing the flow rate when the opening is large is also taken into account. In FIG. 2 and FIG. 3, a horizontal coordinate P represents the valve opening and a vertical coordinate Q represents the flow rate.

In some embodiments, a surface roughness of the first opening segment 122 and the second opening segment 123 is less than or equal to 1.6 μm. In this way, it is ensured that a flow adjustment accuracy is relatively high when the first opening segment 122 and the second opening segment 123 are located at the valve port 21. Specifically, the surface roughness of the first opening segment 122 and the second opening segment 123 may be 1 μm, 1.2 μm or 1.6 μm.

In some embodiments, a roundness of the first opening segment 122 and the second opening segment 123 is less than or equal to 0.005 mm. Each of the circulation segments 1231 is a conical segment, so that the roundness of the each of the circulation segments 1231 is less than or equal to 0.005 mm. In this way, it can be ensured that the flow adjustment accuracy is relatively high when the first opening segment 122 and the second opening segment 123 are located at the valve port 21. Specifically, the roundness of the first opening segment 122 and the second opening segment 123 may be 0.002 mm, 0.004 mm or 0.005 mm.

In the embodiment, the blocking end 12 further includes a diversion segment 124. The diversion segment 124 is arranged on a side of the blocking segment 121 close to the connecting end 11, the blocking segment 121 is connected with the diversion segment 124, and a cross sectional area of the diversion segment 124 close to the connecting end 11 is greater than a cross sectional area of the diversion segment 124 distant from the connecting end 11. In some embodiments, the diversion segment 124 is a conical segment. The diversion segment 124 is configured to divert the fluid, so that the fluid flows towards the valve port 21 along the valve needle 10.

As shown in FIG. 1 and FIG. 4, the embodiments of the present disclosure further provide an electronic expansion valve, including the valve needle 10 described in the above technical solution. The electronic expansion valve is provided with the valve port 21, the valve needle 10 is movably arranged at the valve port 21, the electronic expansion valve has a working state and a stopping state, in a case where the electronic expansion valve is in the working state, the second opening segment 123 of the valve needle 10 is located at the valve port 21, and in a case where the electronic expansion valve is in the stopping state, the blocking segment 121 of the valve needle or the first opening segment 122 is located at the valve port 21. If the electronic expansion valve needs to be in the stopping state for a long time and the refrigerant inside the electronic expansion valve is discharged, the blocking segment 121 is able to block the valve port 21. When the electronic expansion valve stops working and retains the refrigerant inside, it is necessary to make the first opening segment 122 at the valve port 21 to ensure that the refrigerant is in a circulation state with a very small flow rate, so as to avoid the accumulation of the refrigerant inside the electronic expansion valve. When the electronic expansion valve is in the working state, the second opening segment 123 is located at the valve port 21, and the flow rate is adjusted by adjusting the position of each of the circulation segments 1231.

In some embodiments, a gap between the valve port 21 and the first opening segment 122 is greater than or equal to 0.01 mm and less than or equal to 0.06 mm to ensure that the flow rate is relatively small when the first opening segment 122 is located at the valve port 21.

By applying the technical solution, the blocking end 12 includes the blocking segment 121, the first opening segment 122, and the second opening segment 123 that are sequentially connected in the axial direction, the blocking segment 121 is configured to block the valve port 21, the second opening segment 123 is configured to adjust the valve opening to adjust the flow rate, the cross sectional area of the first opening segment 122 remains unchanged, that is, the gap between the first opening segment 122 and the valve port 21 remains unchanged, and when the first opening segment 122 is located at the valve port 21, the valve opening remains stable, so that the flow rate of the liquid remains stable. The circulation segments 1231 are conical segments, and cone angles of the plurality of circulation segments 1231 gradually increase in the direction distant from the connecting end 11, so that when the electronic expansion valve has a small opening, the flow characteristic curve changes gently to meet the requirement for stable adjustment under the working condition of a small flow rate, and when the opening is large, the flow rate changes greatly, and the requirement for quickly increasing the flow rate when the opening is large is considered. The valve needle 10 is simple in structure and easy to machine.

It is to be noted that terms used herein are only for the purpose of describing the specific implementations and not intended to limit exemplary implementations of the present disclosure. For example, singular forms, used herein, are also intended to include plural forms, unless otherwise clearly pointed out. In addition, it is also to be understood that terms "contain" and/or "include" used in the specification refer/refers to existence of features, steps, operations, apparatuses, components and/or combinations thereof.

Unless otherwise specified, relative arrangements of components and steps elaborated in these embodiments, numeric expressions and numeric values do not limit the scope of the present disclosure. Furthermore, it is to be understood that for ease of descriptions, the size of each part shown in the drawings is not drawn in accordance with an actual proportional relation. Technologies, methods and devices known by those of ordinary skill in the art may not be discussed in detail. However, where appropriate, the technologies, the methods and the devices shall be regarded as part of the authorized description. In all examples shown and discussed herein, any specific value should be interpreted as only exemplar values instead of limited values. As a result, other examples of the exemplary embodiments may have different values. It is to be noted that similar marks and letters represent similar items in the following drawings. As a result, once a certain item is defined in one drawing, it is unnecessary to further discus the certain item in the subsequent drawings.

In the description of the present disclosure, it is to be understood that the orientations or positional relationships indicated by the orientation words "front, rear, upper, down, left and right", "transverse, longitudinal, vertical and horizontal", "top and bottom", etc. are based on the orientations or positional relationships shown in the drawings, and are only for the convenience of describing the present disclosure and simplifying the description. Unless stated to the contrary, these orientation words do not indicate or imply that the apparatus or element referred to must have a specific orientation, be constructed and operated in a specific orientation, and therefore cannot be construed as limiting the scope of protection of the present disclosure. The orientation words "inside and outside" refer to inside and outside relative to the outline of each part itself.

For ease of description, spatially relative terms such as "over", "above", "on an upper surface" and "upper" may be used herein for describing a spatial position relation between a device or feature and other devices or features shown in the drawings. It should be understood that the spatially relative terms are intended to contain different orientations of the device in usage or operation besides the orientations of the devices described in the drawings. For example, if the devices in the drawings are inverted, those described as "above other devices or structures" or "over other devices or structures" will then be positioned as "below other devices or structures" or "under other devices or structures". Thus, the exemplary term "above" may include both "above" and "below" orientations. The device may also be positioned in various other ways (rotated 90 degrees or at other orientations) and the spatially relative descriptions used herein are interpreted accordingly.

Furthermore, it is to be noted that the use of the words "first", "second" and the like to define parts is only for the convenience of distinguishing the corresponding parts, unless otherwise stated, the words have no special meaning, and therefore cannot be construed as limiting the scope of protection of the present disclosure.

The above are only some embodiments of the present disclosure, and is not intended to limit the present disclosure, and for those of ordinary skill in the art, various modifications and changes can be made to the present disclosure. Any modifications, equivalent substitutions, improvements, etc. within the spirit and scope of the present disclosure shall be included in the scope of protection of the present disclosure.

What is claimed is:

1. A valve needle, wherein the valve needle is provided with a connecting end and a blocking end that are arranged opposite to each other; the blocking end comprises a blocking segment, a first opening segment, and a second opening segment that are sequentially connected in an axial direction; the blocking segment is configured to cooperate with a valve port to block the valve port; a cross sectional area of the blocking segment close to the connecting end is greater than a cross sectional area of the blocking segment distant from the connecting end; a cross sectional area of the second opening segment close to the connecting end is greater than a cross sectional area of the second opening segment distant from the connecting end; the cross sectional area of the blocking segment distant from the connecting end is equal to the cross sectional area of the second opening segment close to the connecting end; and a cross sectional area of the first opening segment remains unchanged; wherein a length of the first opening segment is greater than or equal to 0.1 mm and less than or equal to 0.6 mm, when the first opening segment is located at the valve port, a gap between the first opening segment and the valve port remains unchanged.

2. The valve needle according to claim 1, wherein the first opening segment is a cylindrical segment, and the blocking segment is a conical segment.

3. The valve needle according to claim 1, wherein the second opening segment comprises a plurality of circulation segments that are sequentially connected in the axial direction, wherein cross sectional areas of at least two circulation segments in the plurality of circulation segments are different, and a cross sectional area of a circulation segment distant from the connecting end is less than a cross sectional area of a circulation segment close to the connecting end.

4. The valve needle according to claim 3, wherein cross sectional areas of the plurality of circulation segments gradually decrease in a direction distant from the connecting end.

5. The valve needle according to claim 3, wherein the circulation segments are conical segments, and cone angles of the plurality of circulation segments gradually increase in a direction distant from the connecting end.

6. The valve needle according to claim 1, wherein a surface roughness of the first opening segment and the second opening segment is less than or equal to 1.6 um.

7. The valve needle according to claim 1, wherein a roundness of the first opening segment and the second opening segment is less than or equal to 0.005 mm.

8. The valve needle according to claim 1, wherein the blocking end further includes a diversion segment, wherein the diversion segment is arranged on a side of the blocking segment close to the connecting end, the blocking segment is connected with the diversion segment, and a cross sectional area of the diversion segment close to the connecting end is greater than a cross sectional area of the diversion segment distant from the connecting end.

9. An electronic expansion valve, comprising the valve needle according to claim 1, wherein the electronic expansion valve is provided with the valve port, the valve needle is movably arranged at the valve port, the electronic expansion valve has a working state and a stopping state, in a case where the electronic expansion valve is in the working state, the second opening segment of the valve needle is located at the valve port, and in a case where the electronic expansion valve is in the stopping state, the blocking segment of the valve needle or the first opening segment is located at the valve port.

10. The electronic expansion valve according to claim 9, wherein the gap between the valve port and the first opening segment is greater than or equal to 0.01 mm and less than or equal to 0.06 mm.

11. The electronic expansion valve according to claim 9, wherein the first opening segment is a cylindrical segment, and the blocking segment is a conical segment.

12. The electronic expansion valve according to claim 9, wherein the second opening segment comprises a plurality of circulation segments that are sequentially connected in the axial direction, wherein cross sectional areas of at least two circulation segments in the plurality of circulation segments are different, and a cross sectional area of a circulation segment distant from the connecting end is less than a cross sectional area of a circulation segment close to the connecting end.

13. The electronic expansion valve according to claim 12, wherein cross sectional areas of the plurality of circulation segments gradually decrease in a direction distant from the connecting end.

14. The electronic expansion valve according to claim 12, wherein the circulation segments are conical segments, and cone angles of the plurality of circulation segments gradually increase in a direction distant from the connecting end.

15. The electronic expansion valve according to claim 9, wherein a surface roughness of the first opening segment and the second opening segment is less than or equal to 1.6 um.

16. The electronic expansion valve according to claim 9, wherein a roundness of the first opening segment and the second opening segment is less than or equal to 0.005 mm.

17. The electronic expansion valve according to claim 9, wherein the blocking end further includes a diversion segment, wherein the diversion segment is arranged on a side of the blocking segment close to the connecting end, the blocking segment is connected with the diversion segment, and a cross sectional area of the diversion segment close to the connecting end is greater than a cross sectional area of the diversion segment distant from the connecting end.

* * * * *